Oct. 21, 1924. 1,512,869
B. VALJEAN
COMBUSTION APPARATUS
Filed Sept. 5, 1922  2 Sheets-Sheet 1
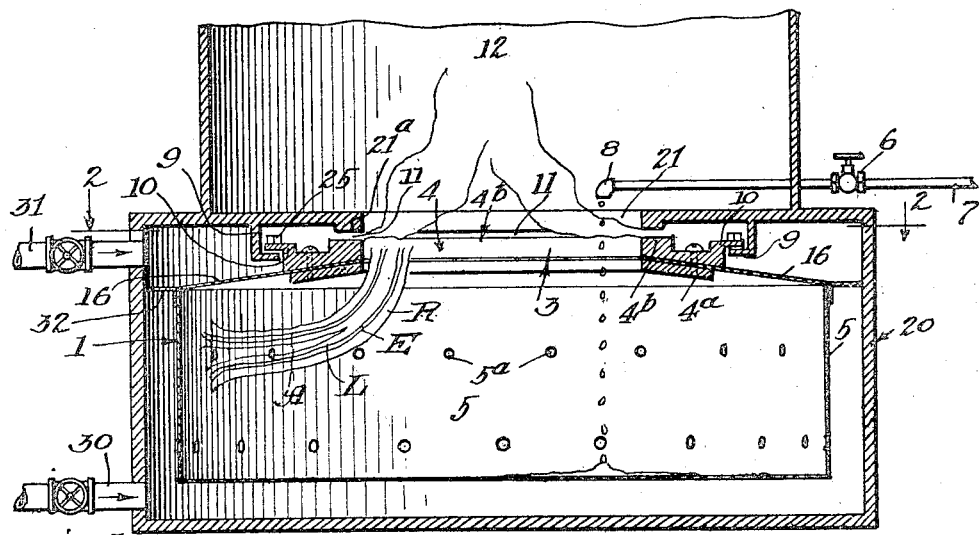
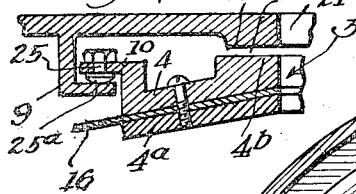
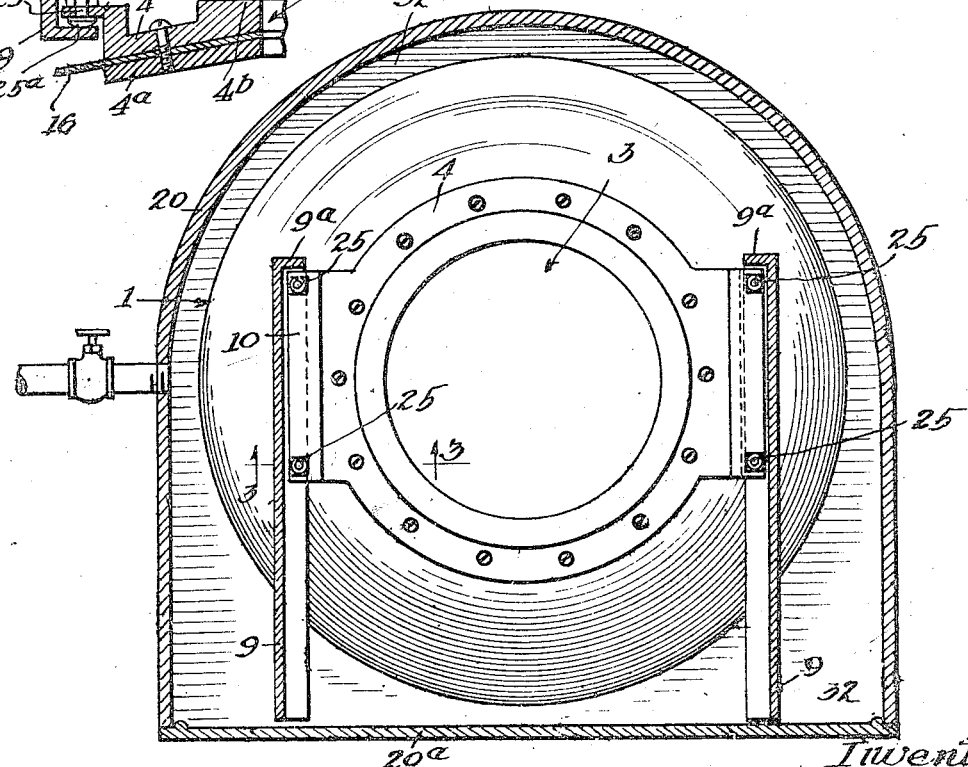
Inventor:
Ben Valjean

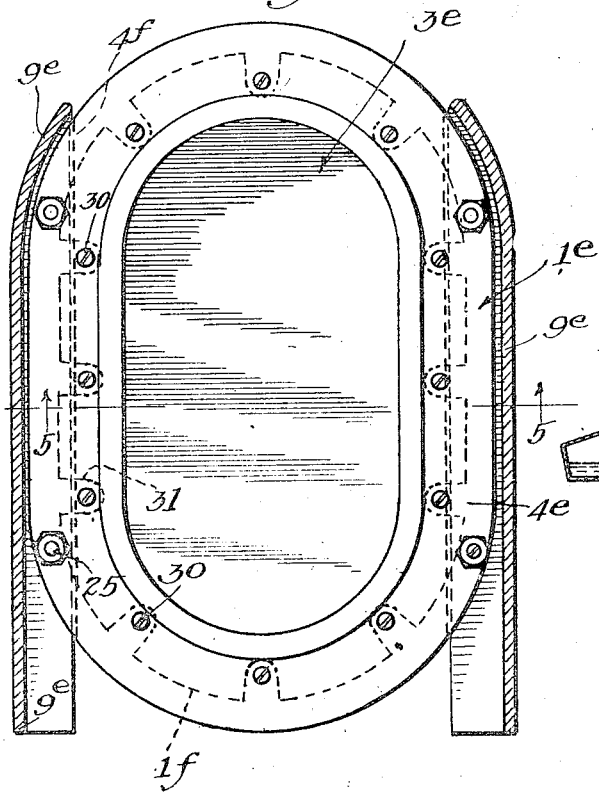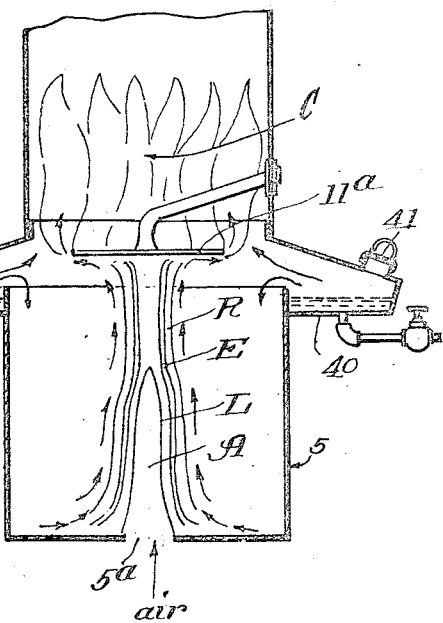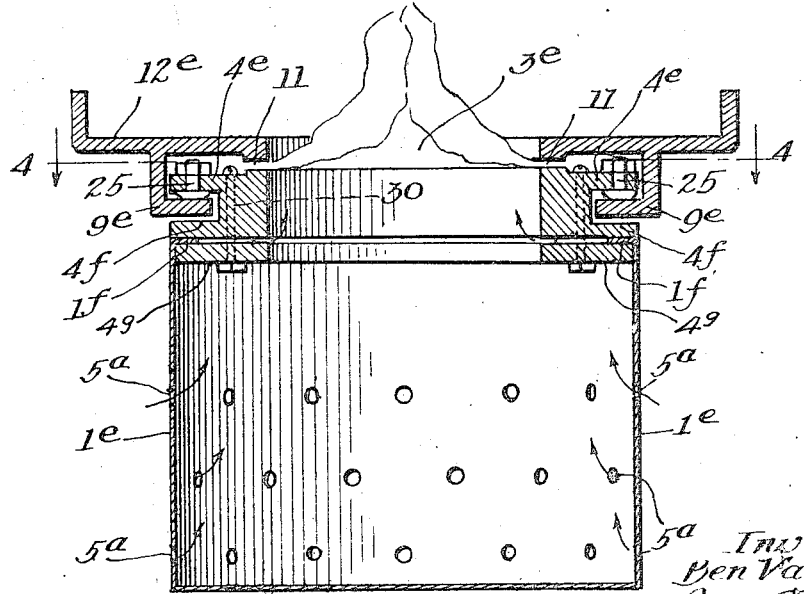

Patented Oct. 21, 1924.

1,512,869

UNITED STATES PATENT OFFICE.

BEN VALJEAN, OF SAN DIEGO, CALIFORNIA, ASSIGNOR TO VALJEAN CARBURETOR COMPANY, OF SAN DIEGO, CALIFORNIA, A CORPORATION OF CALIFORNIA.

COMBUSTION APPARATUS.

Application filed September 5, 1922. Serial No. 586,194.

*To all whom it may concern:*

Be it known that I, BEN VALJEAN, a citizen of the United States, residing at San Diego, in the county of San Diego, State of California, have invented new and useful Improvements in Combustion Apparatus, of which the following is a detailed specification.

This invention relates to apparatus for carrying on such a process of combustion as is set out in my U. S. Letters Patent No. 1,280,596 dated October 1, 1917, for process of combustion, and such as set out in an application filed on even date herewith Serial No. 586,195, for process of combustion.

In order to make the present matter fully clear I will first point out briefly of what those processes of combustion consist. The first mentioned process as explained in said Letters Patent deals fundamentally with a method wherein gaseous fuel is burned from a lean mixture, so to speak, rather than from a rich mixture. That is, a lean non-explosive mixture of gaseous fuel and air is formed and is then mixed with a body that is non-explosively rich in gaseous fuel (either a non-explosively rich mixture of gas and air or gas alone); and combustion takes place from the lean mixture so to speak, rather than from the rich mixture as has been usually the case.

In my improved process as set forth in said co-pending application I form such non-explosive lean and rich mixtures or bodies fundamentally in the same way as described in said issued Letters Patents; and then I precipitate combustion, or limit the point at which combustion must begin occur, by causing lateral flow of the rich and lean streams, as by introducing a current of air flowing crosswise of the flows of the lean and rich bodies. By this means I am able surer and more effectively to locate definitely the position of the flame and thus, in the apparatus, to definitely separate what I may term the carbureting chamber from the combustion chamber, with beneficial results. Further, in said process of the co-pending application I practice the process by introducing air in spaced jets, uniformly, into an atmosphere of gaseous fuel, in such a way that each jet is surrounded by the vaporous atmosphere and is unaffected by the action of adjacent jets. In this manner I am able to make efficient utilization of a given piece of apparatus, producing the maximum of combustion in an apparatus of any given size and at the same time maintaining the high efficiency of my process.

The present invention has for its general object the provision of apparatus for carrying on the process of said co-pending application. There are numerous other objects in this apparatus invention; but as it will be necessary in the following specification more or less to explain the process, those further objects and corresponding accomplishments of the apparatus will best be understood from the following detailed description of preferred and typical forms of apparatus, reference for this purpose being had to the accompanying drawings in which:

Fig. 1 is a vertical section of one form of my combustion apparatus; Fig. 2 is a plan section taken on line 2—2 of Fig. 1; Fig. 3 is an enlarged detail section taken on line 3—3 of Fig. 2; Fig. 4 is a plan similar to Fig. 2 but showing a modified form of apparatus; Fig. 5 is a section taken on line 5—5 of Fig. 4; and Fig. 6 is a vertical section of another form of apparatus.

Referring first most particularly to Figs. 1, 2 and 3 I show therein a typical furnace structure that embodies a combustion chamber or fire-box 12. This of course may be of any size and shape but it is illustrated typically here as being cylindrical. Below fire box 12 there is what I may term the burner enclosure 20, corresponding for instance to the space below the fire box in any furnace. In my combustion apparatus the part of the apparatus that I term the carbureter may be located in chamber 20. This carbureter, in the simple form herein shown as a specific illustrative embodiment of the invention, is cylindrical in form with a flat bottom and with its side walls 5 perforated with holes $5^a$ spaced preferably at regular intervals or fairly regular intervals. These holes may be of the same size throughout or if any are larger than the others I prefer to make the lower holes larger than the upper holes. The features that determine the size and spacing of these holes will be spoken of hereinafter.

The top 16 of the carbureter has a discharge opening 3 preferably formed in the manner shown in the drawings. A cast iron ring 4 on the upper side of the carbureter top 16 and another ring 4ª on the lower side of the carbureter top form this combustion opening 3, as is readily apparent from the drawings; and the combustion chamber 12 also has a registering opening 21 as illustrated. These two openings however, are spaced apart by an air entrance gap 11 for purposes to be hereinafter explained. This gap is formed between an upwardly projecting rim 4ᵇ on ring 4 and a downwardly projecting rim 21ª on the bottom of furnace 12 around opening 21; so that the air entry space outside the air gap 11 will be relatively large and air will have relatively free access to the gap 11, effectual confinement or restriction of the air taking place at the gap only. This insures uniformity of operation.

It is of importance that gap 11 be not only of the proper width but also be of uniform width all around. This condition of course, could be attained by machining the various parts, but I provide a simple arrangement by which the expense of machining may be completely avoided. On the under side of fire box 12 guides or tracks 9 of angle sections are attached or cast. The carbureter ring 4 has two flanges 10 adapted to support the carbureter by resting on tracks 9, the carbureter being slid into place on these tracks and being registered in proper position by being confined laterally between the tracks, for instance, and by having the flanges 10 run in against the ends 9ª of the tracks. Now all these parts may be merely cast; and then in order to make up for any inaccuracies in any or all of the castings, the flanges 10 are provided with members, in the form of bolts 25 whose heads 25ª project below flanges 10 and ride on the tracks. In order to bring flange 4ᵇ into proper position relative to flange 21ª, these bolt heads 25ª may be built up with washers or may be ground down, as occasion may require. Thus by an easy job of fitting the carbureter may be made to come into exactly proper position with relation to the combustion chamber opening 21.

The air supplied the carbureter, to either the air holes 5ª or the air slot 11, or both, may or may not be under pressure as desired. It is one of the fundamentally advantageous features of my process that it is not necessary in order to get complete combustion to create a forced draft or to create a draft to any substantial degree by flue gases; but it may be desired in some cases in order to increase the quantity of fuel that may be efficiently consumed in any given piece of apparatus, and therefore to increase the quantity or intensity of combustion that may take place, to put the air under a suitable pressure. For this purpose various arrangements may be used; I show a simple arrangement in Fig. 1 where the carbureter itself is completely housed in the chamber 20 and air may be controllably admitted under pressure through pipe 30 to the space in chamber 20 surrounding the body of the carbureter to feed air under pressure to perforations 5ª, and air may be controllably introduced under pressure through pipe 31 to the upper part of the chamber 20 to controllably feed air under pressure to air slot 11. A partition or flange 32, which may be built onto the carbureter itself, may divide the portions of the chamber as illustrated. Such an arrangement as this provides that the quantity of air, and the pressure of the air, at apertures 5ª and at slot 11 may be independently controlled. When the apparatus is operated under atmospheric pressure however, air may be admitted in the chamber 20 in any suitable manner, as for instance by providing openings in door 20ª or by leaving the door partially open.

The fuel, as actually burned in the apparatus, is gaseous or vaporous. If it is introduced originally in gaseous or vaporous form it may be introduced in any manner suitable for filling carbureter 1 as will be readily understood. However, in this particular embodiment I illustrate an arrangement for introducing the fuel originally in liquid form through a pipe 7 controlled by valve 6 having elbow 8 at its end standing over opening 21. The fuel merely drops down through the opening onto the carbureter bottom 1ª and there spreads out in a thin film or body where it is readily vaporized by the reflected heat of the flame. In initially generating the apparatus the fuel is introduced to the carbureter and is ignited in any suitable way. Until sufficient heat is developed to put the apparatus into full operation, combustion takes place within the carbureter itself; but as soon as sufficient heat is developed then a sufficient quantity of vapor is at all times evolved to more or less completely fill the carbureter with an atmosphere of vapor. When this has taken place then the operation, without going into minor details, which are properly the subject matter of the copending process application, may be described as follows: Air is entering at all times through perforations 5ª; and each jet of air projects itself inwardly into the atmosphere of vapor in the carbureter. These air jets are spaced far enough apart that no one inteferes with its neighbors, and so at each air jet we have an inner pencil A of air and then immediately surrounding that we have an envelope L of lean non-explosive mixture. Then surrounding that we have a thin envelopeing film E of explosive mixture; and then surrounding that we have an envelope R of non-explosive rich mixture and then the outer surrounding body of vapor atmosphere. These conditions are created, as will readily be understood, by the action of the inflowing jet of air drawing along with it a certain amount of the vaporous atmosphere, all traveling upwardly toward the opening 3. Opening 3 is large enough that it preferably does not constrict or compress these upwardly traveling distinct streams of mixtures sufficiently to cause them to intermingle and become explosive; but the inwardly and transversely (horizontally) traveling stream of air that comes through annular slot 11 travels athwart those upwardly moving mixture streams and intimately and thoroughly mixes them and causes complete combustion to take place at that point, if it has not taken place lower down in the mixture. In other words, regardless of the amount of fuel that is fed into the carbureter and regardless of the quantity of combustion, that combustion is always limited finally to begin no further up than slot 11. Of course, if the burner is turned down excessively then the combustion more or less recedes into the carbureter; but when the apparatus is operated at its normal or its full capacity the flame always has the appearance of issuing from slot 11.

In the form of Figs. 1 and 2, for operation under atmospheric pressure, the following dimensions (without intending this statement to be a limitation in any way) have been found successful; carbureter 20 inches diameter and 10 inches high over all. Holes 5ª in two rows, bottom row not over 1½ inches from carbureter, bottom and upper row about 3½ inches above lower row. Holes in upper row five-sixteenths inch diameter and in lower row three-eighths inch. Opening at 3 is 12 inches in diameter and gap 11 is ¼ inch wide. A burner of this size will successfully carry on the process consuming as little as one-quarter gallon or as much as eight gallons of fuel distillate per hour by natural draft. By enlarging the air jet holes, increasing their number, enlarging opening 3, enlarging gap 11, and by using air pressure, the capacity may be increased many fold.

In Figs. 4 and 5 I illustrate another specific form of burner. Here the carbureter 1ᵉ is oval in shape instead of cylindrical as shown in the previous views and the opening 3ᵉ is also of oval shape. It will also be noticed that the opening 3ᵉ is larger in proportion to the size of the carbureter than is the opening 3 in Fig. 1. The size of this opening is one of the determining factors of the apparatus in producing a condition that will cause my process of combustion properly to proceed; when it is necessary to prevent eddy currents of air down into the carbureter and as illustrated in these drawings this opening may be varied in size in proportion to the size of the carbureter shell itself.

Also in these figures I have shown slightly modified construction. The bottom wall of the combustion chamber 12ᵉ has a track 9ᵉ similar to that hereinbefore explained; and an oval ring 4ᵉ on top the carbureter forms the opening 3ᵉ as illustrated. Instead of the ring having projecting flanges such as the flanges 10 of Figs. 1 and 2, here the ring 4ᵉ has a slot 4ᶠ cut in it for engagement with the track 9ᵉ. This arrangement forms in effect in the upper part of ring 4ᵉ, a flange over the slot 4ᶠ and through this flange the bolts 25 are inserted so that their heads bear on the track in the manner hereinbefore explained.

The sheet metal forming the shell of the carbureter is turned inwardly at its upper edge as illustrated at 1ᶠ and is clamped between the ring 4ᵉ and another ring 4ᵍ, bolts or screws 30 being used for this purpose. Or the sheet metal may be attached directly to the cast iron by pouring the molten cast iron around it at the foundry. A groove must in this case be provided in the pattern of the cast iron ring 4ᵉ into which the sheet metal is placed before the iron is poured. In this latter case the ring 4ᵍ and bolts 30 are not necessary. The edge 1ᶠ does not extend very far inwardly, except at points, as illustrated at 31, where it extends inwardly to take the bolts 30. Thus if air leakage occurs at the inwardly turned flange 1ᶠ, it is then free to pass on inwardly between the spaced rings 4ᵉ and 4ᵍ and thus emerges in the main opening 3ᵉ where it passes upwardly into the flame. The leakage of air is thus prevented from passing back around and down the outside edge of ring 4ᶠ and is thus prevented from disturbing proper atmospheric conditions in the carbureter shell. The lower row of holes 5ª may be tipped down to direct their jets down onto or near the fuel to aid in vaporization of heavier oils and the baffle, by reflecting heat also aids in this.

In Fig. 6 I show another form of apparatus wherein the transverse (horizontal) movement of the gaseous streams is induced by a baffle 11ª, instead of by the air gap 11. The carbureter 5 has a hole 5ª at its bottom; the fuel is fed into the annular pan 40 around the upper edge of the carbureter, and during generation air is admitted at 41. When the fuel is heated sufficiently to supply the necessary quantity of vapor air inlet 41 is shut off and the combustion at C thenceforth supplies enough heat to continue vaporization of the fuel at the necessary rate. During combustion a central stream of air is drawn upwardly through opening 5ª and through the central part of the carbureter shell, under baffle 11ª. The vapors from the liquid fuel in pan 40 are partly drawn down into the outer portions of the shell around the central air stream and there form annular streams of mixture in the same general manner as hereinbefore described; and partly the vapor rises directly into the space surrounding the baffle. The upwardly flowing concentric streams of air and different mixtures, or the mixtures above, reach the under side of the baffle and are there spread out and thus mixed with each other and with the surrounding vapors and then ignite at or near the edge of the baffle. The streams of air and lean, explosive and rich mixtures are shown at A, L, E and R, respectively. The baffle not only turns and mixes the streams but also acts to radiate heat into the carbureter and onto the liquid fuel. It may be made of any suitable material and supported in any convenient way.

It is this definite determination of the point of combustion and the point of maximum heat that is one of the important features of the present invention. It admits of a definite and accurate application of the heat at any desired point and in any desired manner. It makes it possible to definitely locate any heavy insulating protection desirable in the fire box and to properly locate the fire box in relation to the work to be done. Likewise, it makes it possible that the carbureter itself may be made of light material, such as sheet metal, and may be easily removable; but at the same time it is enduring because it is not exposed directly to the fire box action.

In connection with these remarks it will be noted that a change in the amount of fuel used does not affect the location at which the flame starts in the fire box, therefore it is possible and practicable in a device of the character herein described to so locate the flame as to determine accurately the reflex heat action upon the carbureter for the purpose of properly vaporizing the different grades and classes of fuel.

Having described a preferred form of my invention, I claim:

1. Combustion apparatus, embodying a combustion chamber with an opening, a carbureter shell with an upper discharge opening registering with the combustion chamber opening, the edges of the two openings being spaced apart to form an air entry slot through which air enters in a direction across the axis of the openings, the carbureter shell having air entry openings in its wall, and means to introduce fuel to the carbureter shell.

2. Combustion apparatus, embodying a combustion chamber with an opening, a carbureter shell with an upper discharge opening registering with the combustion chamber opening, the edges of the two openings being spaced apart to form an air entry slot of uniform width extending completely around the opening and through which air enters in a direction across the axis of the openings, the carbureter shell having air entry openings in its wall, and means to introduce fuel to the carbureter shell.

3. Combustion apparatus, embodying a combustion chamber with an opening, a carbureter shell with an upper discharge opening registering with the combustion chamber opening, the edges of the two openings being spaced apart to form an air entry slot through which air enters in a direction across the axis of the openings, the carbureter shell having air entry openings in its wall, and means to introduce liquid fuel to the carbureter shell to be vaporized to form an atmosphere of vapor in the shell.

4. Combustion apparatus, embodying a combustion chamber with an opening, a carbureter shell with an upper discharge opening registering with the combustion chamber opening, the edges of the two openings being spaced apart to form an air entry slot through which air enters in a direction across the axis of the openings, the carbureter shell having air entry openings uniformly spaced around its wall, and means for introducing fuel to the carbureter shell.

5. Combustion apparatus, embodying a combustion chamber with an opening, a carbureter shell with an upper discharge opening registering with the combustion chamber opening, the edges of the two openings being spaced apart to form an air entry slot through which air enters in a direction across the axis of the openings, the carbureter shell having air entry openings uniformly spaced around and vertically of its walls, and means to introduce fuel to the carbureter shell.

6. Combustion apparatus, embodying a combustion chamber with an opening, a carbureter shell with an upper discharge opening registering with the combustion chamber opening, the edges of the two openings being spaced apart to form an air entry slot of uniform width extending completely around the openings and through which air enters in a direction across the axis of the openings, the carbureter shell having air entry openings uniformly spaced around its wall, and means to introduce fuel to the carbureter shell.

7. Combustion apparatus, embodying a combustion chamber with an opening in its bottom and an annular bead around the lower side of the opening, a carbureter shell with an upper plate forming a discharge opening registering with the combustion chamber opening, the plate having an annular bead around the upper side of the opening and lying opposite and spaced from the bead around the combustion chamber opening to define a restricted air entry slot through which air enters in a direction across the axis of the openings, the carbureter shell having air entry openings in its wall, and means to introduce fuel to the carbureter shell.

8. Combustion apparatus, embodying a combustion chamber with an opening in its bottom and an annular bead around the lower side of the opening, a carbureter shell with an upper plate forming a discharge opening registering with the combustion chamber opening, the plate having an annular bead around the upper side of the opening and lying opposite and spaced from the bead around the combustion chamber opening to define a restricted air entry slot of uniform width extending completely around the openings and through which the air enters in a horizontal direction, the carbureter shell having air entry openings spaced uniformly around its wall, and means to introduce fuel to the carbureter shell.

9. Combustion apparatus embodying a combustion chamber with a wall having an opening, a carbureter with a wall having an opening registering with the combustion chamber opening, and means to hold the carbureter in such relation to the combustion chamber as to space the two walls and openings apart to form an air inlet slot between the walls through which air enters the openings in a direction transverse of their axis.

10. Combustion apparatus embodying a combustion chamber with a wall having an opening, a carbureter with a wall having an opening registering with the combustion chamber opening, and means to hold the carbureter in such relation to the combustion chamber as to space the two walls and openings apart to form an air inlet slot of uniform width between the walls around the openings; said means embodying supports on the chamber, flanges on the carbureter and bolt heads on the flanges adapted to ride on the supports.

11. Combustion apparatus embodying a combustion chamber with a wall having an opening, a carbureter with a wall having an opening registering with the combustion chamber opening, and means to hold the carbureter in such relation to the combustion chamber as to space the two walls and openings apart to form an air inlet slot of uniform width between the walls around the openings; said means embodying supporting tracks on the chamber, flanges on the carbureter and three or more bolts set in the flanges with their heads adapted to ride on the supporting tracks.

In witness that I claim the foregoing I have hereunto subscribed my name this eighteenth day of August, 1922.

BEN VALJEAN.

Witnesses:
RUTH NORBERG,
J. S. CAMPBELL.